United States Patent
Kumble et al.

(10) Patent No.: US 12,014,196 B2
(45) Date of Patent: Jun. 18, 2024

(54) ARCHITECTURE GENERATION FOR STANDARD APPLICATIONS

(71) Applicant: KYNDRYL, INC., New York, NY (US)

(72) Inventors: Ramesh Kumble, Ashburn, VA (US); Prathima Maskeri, Chantilly, VA (US); Malini Appalla, Herndon, VA (US)

(73) Assignee: Kyndryl, Inc., New York, NY (US)

( * ) Notice: Subject to any disclaimer, the term of this patent is extended or adjusted under 35 U.S.C. 154(b) by 604 days.

(21) Appl. No.: 17/207,815

(22) Filed: Mar. 22, 2021

(65) Prior Publication Data

US 2022/0300311 A1  Sep. 22, 2022

(51) Int. Cl.
| | | |
|---|---|---|
| G06F 9/455 | (2018.01) | |
| G06F 17/18 | (2006.01) | |
| G06N 5/04 | (2023.01) | |
| G06N 20/20 | (2019.01) | |

(52) U.S. Cl.
CPC .......... G06F 9/45533 (2013.01); G06F 17/18 (2013.01); G06N 5/04 (2013.01); G06N 20/20 (2019.01); G06F 9/45541 (2013.01)

(58) Field of Classification Search
CPC ....... G06F 9/45533; G06F 17/18; G06N 5/04; G06N 20/20
See application file for complete search history.

(56) References Cited

U.S. PATENT DOCUMENTS

| | | | |
|---|---|---|---|
| 7,062,426 B1 * | 6/2006 | McDonald | G06F 9/5016 703/2 |
| 8,533,103 B1 * | 9/2013 | Certain | G06Q 30/06 705/37 |
| 8,566,835 B2 | 10/2013 | Wang | |

(Continued)

OTHER PUBLICATIONS

Ganesan, Rajeshwari, et al., "Analysis of SaaS Business Platform Workloads for Sizing and Collocation," 2012 IEEE Fifth International Conference on Cloud Computing, 8 pages.

(Continued)

*Primary Examiner* — Dong U Kim
(74) *Attorney, Agent, or Firm* — Dan Housley; Andrew M. Calderon; Calderon Safran & Wright, P.C.

(57) ABSTRACT

In an approach to improve the field of architecture generation by dynamically sizing computer system architecture requirements for virtual machines. Embodiments define static parameters and dynamic parameters for customer consuming resources of the computer system architecture and store data of the static parameters and dynamic parameters in data warehouse database (DWDB) tables. Further, embodiments compute, using the data of the DWDB tables, calculate the minimum, maximum, mean and standard deviation (SD) for the user count and the CPU and memory usage, and update the DWDB tables based on the minimum, maximum, and SD values per customer. Additionally, embodiments classify an architecture size associated with each of the customers, create a reference architecture for each of the one or more vertical industries and the archi- (Continued)

tecture size, and optimize, by an analytical database, the computer system architecture provided to one or more customer based on the computed data of the DWDB for the one or more vertical industries.

20 Claims, 4 Drawing Sheets

(56) References Cited

U.S. PATENT DOCUMENTS

| | | | |
|---|---|---|---|
| 8,756,610 | B2 | 6/2014 | Dasgupta |
| 9,037,717 | B2 | 5/2015 | Canturk |
| 9,300,552 | B2 | 3/2016 | Dube |
| 10,409,642 | B1* | 9/2019 | Tang ..................... G06F 9/5005 |
| 2007/0006218 | A1 | 1/2007 | Vinberg |
| 2009/0119256 | A1* | 5/2009 | Waters ............... H04L 41/5064 |
| 2010/0131959 | A1 | 5/2010 | Spiers |
| 2014/0180862 | A1* | 6/2014 | Certain .................. G06Q 30/08 |
| | | | 705/26.3 |
| 2015/0169291 | A1* | 6/2015 | Dube ....................... G06F 8/61 |
| | | | 717/101 |
| 2017/0017918 | A1* | 1/2017 | Sirmokadam .......... G06Q 10/04 |
| 2017/0163507 | A1* | 6/2017 | Pai .......................... H04L 43/06 |
| 2017/0353531 | A1* | 12/2017 | Conn ..................... G06F 11/34 |
| 2017/0357532 | A1* | 12/2017 | Miraftabzadeh ........ H04L 41/40 |
| 2019/0132222 | A1* | 5/2019 | Son ....................... H04L 67/562 |
| 2020/0028739 | A1* | 1/2020 | Shekar ................... H04L 41/40 |

OTHER PUBLICATIONS

Morariu, Octavian, et al., "Predictive Provisioning of Workloads for Dynamic Application Scaling in Cloud Environments," U.P.B. Sci. Bull., Series C, vol. 76, Iss. 3, 2014, 14 pages.

Tchana et al., "Two levels autonomic resource management in virtualized IaaS," Future Generation Computer Systems 29, No. 6, 2013, pp. 1319-1332.

* cited by examiner

ARCHITECTURE GENERATION FOR STANDARD APPLICATIONS

BACKGROUND OF THE INVENTION

The present invention relates generally to the field of architecture generation, and more particularly to architectural generation based on empirical data and statistical modeling.

In computer engineering, computer architecture is a set of rules and methods that describe the functionality, organization, and implementation of computer systems. Some definitions of architecture define it as describing the capabilities and programming model of a computer but not a particular implementation. In other definitions computer architecture involves instruction set architecture design, microarchitecture design, logic design, and implementation. Computer architecture is concerned with balancing the performance, efficiency, cost, and reliability of a computer system. The case of instruction set architecture can be used to illustrate the balance of these competing factors. More complex instruction sets enable programmers to write more space efficient programs, since a single instruction can encode some higher-level abstraction (such as the x86 Loop instruction). However, longer and more complex instructions take longer for the processor to decode and can be more costly to implement effectively. The increased complexity from a large instruction set also creates more room for unreliability when instructions interact in unexpected ways. The implementation involves integrated circuit design, packaging, power, and cooling. Optimization of the design requires familiarity with compilers, operating systems to logic design, and packaging.

SUMMARY

Embodiments of the present invention disclose a method, a computer program product, and a dynamically sizing computer system architecture requirements for virtual machines, the computer-implemented method comprising: defining static parameters and dynamic parameters for customer consuming resources of the computer system architecture; storing data of the static parameters and dynamic in data warehouse database (DWDB) tables; computing, using the data of the DWDB tables, wherein the computing comprises: grouping one or more statistics of the gathered data by customer name and one or more vertical industries; calculating a minimum and a maximum for a user count and central processing unit (CPU) usage and memory usage values for a 24 hour period; and calculating minimum, maximum, mean and standard deviation (SD) for the user count and the CPU and memory usage over the 24 hour period; updating the DWDB tables based on the minimum, maximum, and SD values per customer; classifying, based on the mean user count for customers, an architecture size associated with each of the customers; creating a reference architecture for each of the one or more vertical industries and the architecture size; and storing the computer data by the one or more vertical industries; and optimizing, by an analytical database, the computer system architecture provided to one or more customer based on the computed data of the DWDB for the one or more vertical industries and time zone of each respective customer using the minimum, the maximum, the mean and the SD for the CPU, and the memory values using an AI-based architecture sizing decision tree.

DETAILED DESCRIPTION

Figure 1:
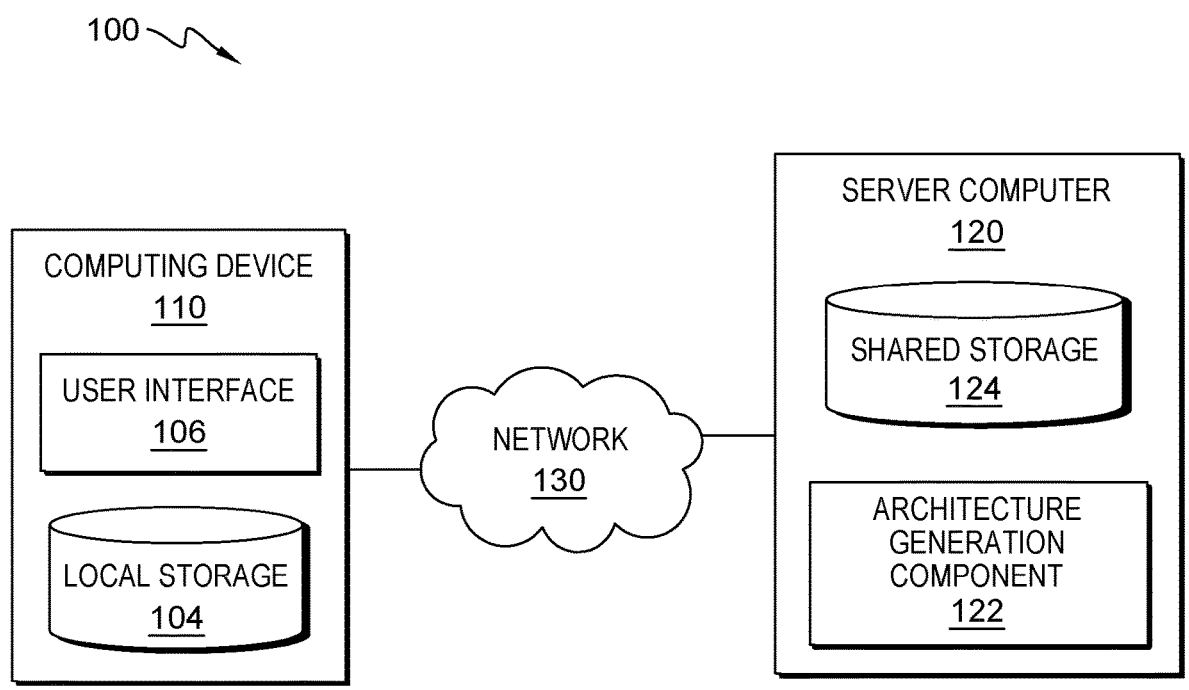
FIG. 1 is a functional block diagram illustrating a distributed data processing environment, in accordance with an embodiment of the present invention.

Embodiments of the present invention recognize that currently in the art application programs (applications) are complex and each behave differently depending on how the applications are setup. Embodiments of the present invention recognize that same applications run differently for each vertical industry and consume different amount of system resource such as central processing unit (CPU), memory, storage, and/or other system resources known in the art. Additionally, embodiments of the present invention recognize that depending on application deployed and customer requirements, infrastructure architecture to support the application changes and/or may need to be adjusted. Embodiments of the present invention recognize that there are slack and peak workload periods for application execution. Further, embodiments of the present invention recognize that based on the issues detailed above there are a multitude of challenges such as the sizing of system architecture being dependent on subject matter expert (SME) for each application. Additionally, embodiments of the present invention recognize that the solution is based on SMEs insight to the product and not based on empirical data, wherein some SME may not be available for every new release.

Embodiments of the present invention recognize that no two SMEs provide the same system size in terms of cores and memory because sizing is based on the SME's experience based on the vertical industry the SME has worked in. Further, embodiments of the present invention recognized that currently there is no data to show peak, average, and slack time computation requirements, which vary by vertical industry, time of the day and the peak period due to holiday sales and architecture proposed needs to correlate with the service-level agreement (SLA) requirement whereby application high availability is met. Embodiments of the present invention addresses all the above challenges by building a solution based on artificial intelligence (AI) using a statistical method of Mean Deviation and Standard deviation.

Embodiments of the present invention improve the art by capturing realistic data, wherein capturing realistic data comprises capturing empirical data collected from real-time systems running applications. Embodiments of the present invention propose solutions to the problems outlined above through product, process, and workload. Embodiments of the present invention improves the art and solves the problems stated above by generating system architecture and sizing for standard applications beyond enterprise resource planning (ERP) systems by responding to questions such as vertical industry, application, and number of users. Further, embodiments of the present invention generate uniquely for each type of hypervisor such as but not limited to virtual machine ware (VMware) (overcommit allowed), Oracle virtual machine (VM) (hard partitioned where cores are pinned), capped and uncapped logical partition (LPAR) and bare-metal Servers running variant operating systems, wherein some of the variant operating systems may be more granular. In some embodiments of the present invention some of the solutions are accurate to a specific type of Virtualization and bare-metal.

Embodiments of the present invention enable the system utilization data to be continually refined with real data by the application, version, vertical industry, virtual/bare-metal system, operating system, operating system version, and time zone. The predetermined amount of data populated and updated continually to the data warehouse database (DWDB) brings credibility to the architecture generated for prospective customers based on the architectural database (ADB). Embodiments of the present invention provide dynamic solutions to customer cyclic workloads and for specific vertical industries, wherein the solutions can be based on peak load or standard or mean deviation showing dense workload or combination of both. If the standard deviation (SD) is not within a predetermined range from the mean then the minimum and/or maximum would be used. Embodiments of the present invention also enhance the data for high availability by way of load balanced web page (Web), application and DB servers. Embodiments of the present invention improve the art by assisting in the deployment of customer systems which would help datacenter capacity management.

Implementation of embodiments of the invention may take a variety of forms, and exemplary implementation details are discussed subsequently with reference to the Figures (i.e., FIG. 1-FIG. 4).

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of interfaces 106. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 4.

User interface (interface) 106 provides an interface to architecture generation component 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 4. In some embodiments server computer 120 may represent a plurality of server computers.

Each of shared storage 124 and local storage 104 may be a data/knowledge repository and/or a database that may be written and/or read by one or a combination of architecture generation component (component) 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory. In various embodiments of the present invention, shared storage 124 comprises multiple databases. In some embodiments, not depicted in FIG. 1, shared storage comprises a data warehouse database (DWDB) and an analytics database (ADB).

In the depicted embodiment, component 122 is executed on server computer 120. In other embodiments, component 122 may be executed on computing device 110. In various embodiments of the present invention, not depicted in FIG. 1, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer 120, via network 130.

In various embodiments of the present invention, component 122 builds a required database for data capture. In various embodiments of the present invention, component 122 builds a required data base for data capture by (i) building a data warehouse database (DWDB) to retrieve and collect customer and associated system information (i.e., static data); (ii) enhancing the DWDB for architecture design by adding components such as System Activity Report (SAR), virtual memory statistics (VMStat), or input/output statistics (IOSTAT) to retrieve real-time data such as application data, user data, CPU data, and memory usage data; and (iii) calculating the mean deviation, standard deviation, minimum and maximum values of the real-time data by week, month and year and using the computed mean, mean deviation, standard deviation, minimum and maximum values of the real-time data to enhance DWDB.

In various embodiments of the present invention, component 122 segregates the collected data and builds a model to produce a predetermined number of VM/bare-metal size in terms of cores and memory required to run the application based on predetermined responses. Based on received inputs from the data available in the analytics database (e.g., shared storage 124), component 122 may output results in terms of number of VMs/bare-metal, cores and memory for a plurality of VM/bare-metal to be deployed to run the application for a predetermined amount of tiers (e.g., web, application, and database). In various embodiments of the present invention, the inputs from the available data in the analytics database (e.g., shared storage 124) comprise: vertical industry data, the application to be deployed, key modules, the geography where the architecture would be used, the number of time zones that the architecture would cater (e.g., 1, 2 or 3), the expected number of regular and peak users, and the service level agreement. The embodiments described above improve the art by providing accurate outputs and credibility to prospective architecture. In various embodiments of the present invention, component 122 may output accurate sizing of an application during architecture design. Component 122 may output to one or more users, via computing device 110, the architecture requirements to run a specific product taking into account the number of users, applications, time zones, and/or any other data inputs known in the art.

In various embodiments of the present invention, component 122 constructs a front-end architectural database with computed statistical values and incorporates key components associated with the captured data such as application data, operating system, vertical industry, and number of users. In various embodiments of the present invention, component 122 captures data and details of a web page connected to the backend database and stores the captured data on the constructed architectural database. In various embodiments of the present invention, component 122 instructs the architecture, based on the architectural database and computed statistical values, to run an application. In other embodiments of the present invention, component 122 executes an application on the architecture based database and computed statistical values.

In various embodiments of the present invention, component 122 defines static and dynamic parameters, wherein static parameters (i.e., static data) comprise, but are not limited to, customer name, vertical industry, application name and version, database name and version, operating system (OS) name and version, CPU and memory allocated, and wherein the dynamic parameters (i.e., dynamic data) comprise, but are not limited to, user counts, CPU and memory utilization. In various embodiments of the present invention, component 122 gathers dynamic parameters per customer, per node, periodically, wherein the periodical gathering of dynamic parameters is predetermined. In one example, the periodical gathering of dynamic parameters occurs in one-minute intervals using standard methods like System Activity Report (SAR), virtual memory statistics (VMStat), or input/output statistics (IOSTAT) as they are known in the art.

In various embodiments of the present invention, component 122 stores the above information in the data warehouse database (DWDB) tables within shared storage 124. Component 122 may continuously add collected and received data to shared storage 124, via the DWDB tables. In various embodiments of the present invention, component 122 computes the data collected and stored in the DWDB tables at regular intervals, wherein the regular intervals are predetermined. Component 122 may perform the following computations on the data collected and stored in the DWDB tables: (i) group the statistics gathered by customers and one or more vertical industries (VI); (ii) retrieve Minimum (min) user and Maximum (max) user count for a predetermined amount of time (e.g., a 24 hour period); (iii) categorize customers into either a single time zone (TZ) or multi-time zone customer based on this data; (iv) retrieve the min and max CPU and memory usage with the date and time for a predetermined amount of time (e.g., in the span of 24 hours there will be 1440 entries per customer as data is collected every minute for 24 hours); (v) compute and store the minimum (min), maximum (max), mena, mean deviation (MD), and SD for the user count, CPU, and memory usage on a daily basis for one or more customers; (vi) compute weekly/Monthly/Yearly min, max, mean and SD per customer and update DWDB table to assist in predicting peak and trough consumption values; (vii) categorize and classify the customer Architecture into either extra-small (XS), small (S), medium (M) or large (L) size based on the mean user count for each customer, wherein the sizes are predetermined or customizable; and (viii) consolidates data from (vi) and (vii) for customers of a Vertical Industry, time zone, specified application, OS and database data. The consolidated data may be output to one or more users and will act as a new reference architecture for a particular Vertical Industry and Customer size based on XS, S.

In various embodiments of the present invention, component 122 stores analyzed data consolidated per vertical industry and size for a predetermined amount of time, wherein at the expiration of the predetermined amount of time component 122 moves computed data to the analytical database. For example, storing analyzed data consolidated per VI per size for 52 weeks (i.e., one year), wherein at the end of the 52 weeks, component 122 moves the computed min, max, mean and standard deviation for CPU, memory and user counts to ADB (Analytical Database). In various embodiments of the present invention, component 122 continually executes the defining static and dynamic parameters through the storing analyzed data for a predetermined amount of time, as described above. In various embodiments of the present invention, when a new architecture is provided for a customer, component 122 produces and/or retrieves the optimal architecture, from shared storage 124, based on latest data available for that vertical industry, for that Time zone based on min, max, mean and SD for CPU and memory values.

Figure 2:
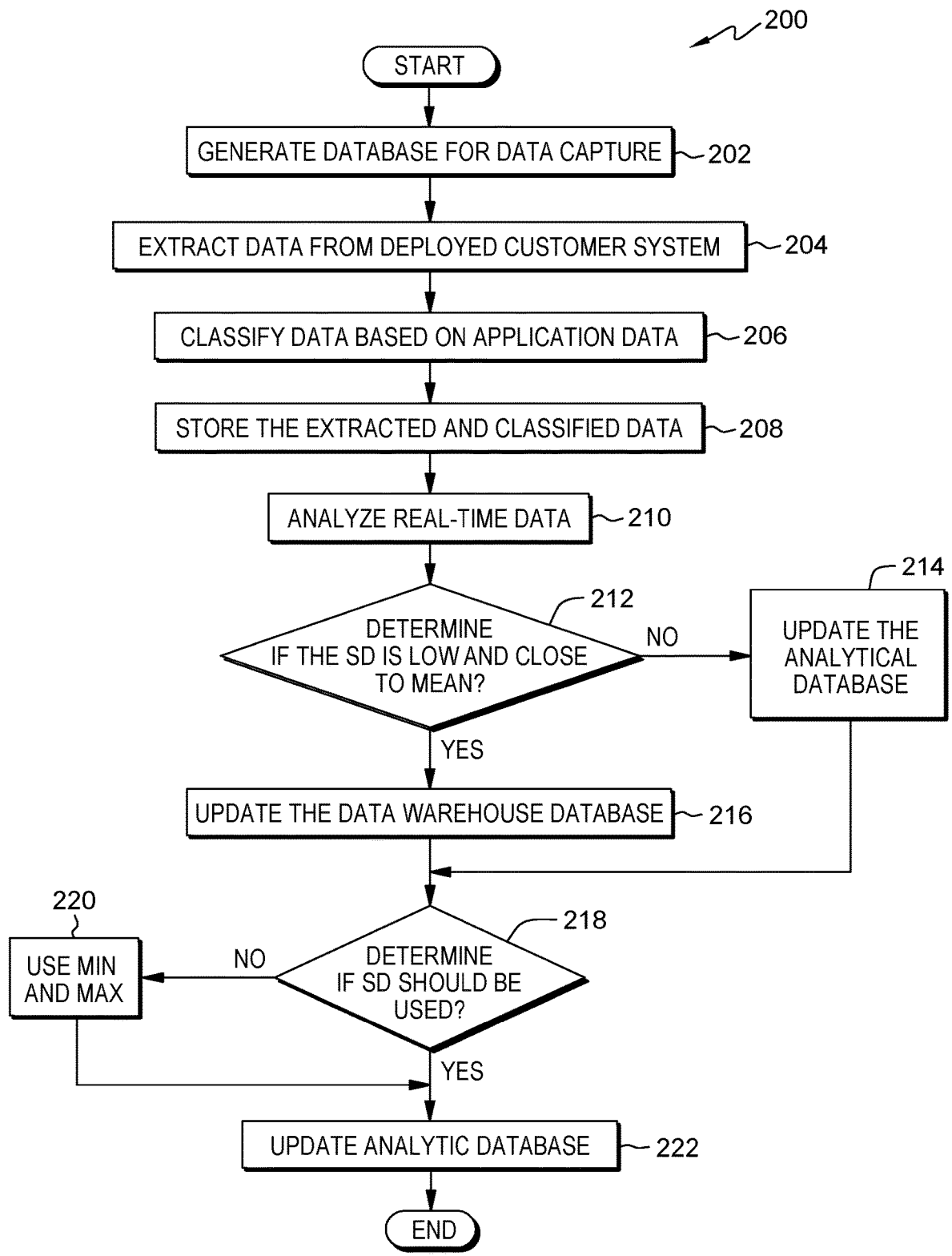
FIG. 2 illustrates operational steps of an architecture generation component, on a server computer within the distributed data processing environment of FIG. 1, for dynamically sizing computer system architecture requirements for bare-metal or virtual machines, in accordance with an embodiment of the present invention.

FIG. 2 illustrates operational steps of component 122, generally designated 200, in communication with computing device 110, within distributed data processing environment 100 of FIG. 1, for dynamically sizing computer system architecture requirements for bare-metal or virtual machines, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In step 202, component 122 generates a database for data capture. In various embodiments of the present invention, component 122 builds a required database for data capture. In various embodiments of the present invention, component 122 builds a required data base for data capture by (i) building a data warehouse database (DWDB) to retrieve and collect customer and associated system information (i.e., static data); (ii) enhancing the DWDB for architecture design by adding components to retrieve real-time data such as application data, user data, CPU data, and memory usage data; and (iii) enhancing DWDB using computed data of mean, SD, min and max values by week, month and year.

In step 204, component 122 extracts data from deployed customer systems. In various embodiments of the present invention, component 122 extracts data from a plurality of customer's systems, wherein the extracted data is static data and dynamic data. The extracted static data comprises, but is not limited to, customer data, application data, vertical industry data, OS version, function (Web/App/DB), core allocation, memory allocation. In various embodiments of the present invention, component 122 collects dynamic data based on a predetermined interval, dynamic data comprises, but is not limited to, CPU utilization, memory utilization and users connected from the system activity report. For example, every 5 minutes component 122 collects dynamic data from customer production systems. In various embodiments of the present invention, component 122 updates the generated/built DWDB tables by uploading the extracted static data and/or the dynamic data. In one particular example, component 122 periodically extracts and collects for each customer, per node, the dynamic parameters at one-minute intervals.

In step 206, component 122 classifies data based on application data. In various embodiments of the present invention, component 122 classifies the static data based on the application data (e.g., application name and version), vertical industry, time zone, virtualization, OS, Web, application (APP), and database.

In step 208, component 122 stores the extracted and/or classified data in a warehouse database (e.g., DWDB). In various embodiments of the present invention, component 122 stores the extracted and/or classified data in a database (DB) by customer. In various embodiments of the present invention, component 122 stores the static and dynamic data in data warehouse database (DWDB) tables. DWDB may comprise raw data populated from various customer production systems, wherein mean, min, max, and SD may be computed on DWDB. In various embodiments of the present invention, ADW is the final DB against which new solutions are prepared based on a factors like, but not limited to, Vertical Industry, Number of users, Number of Time Zone, Application, and product(s) that would be used. In various embodiments of the present invention, if the SD is not within a predetermine range of the mean, then the computed value mean, min and max is populated in ADB. In various embodiments of the present invention, if the SD is within a predetermine range of the mean, then there is hardly any dispersion and an AI engine will collect and/or retrieve the SD and its associated value. In statistical analysis larger dispersion means data sets are far from each other forcing to use min and max as variations are large. The decision to use min-max is based on how far the SD is from mean.

In step 210, component 122 analyzes real-time data. In various embodiments of the present invention, component 122 analysis real-time data available in the DWDB for further analysis. In various embodiments of the present invention, for each customer systems (Web, Application, and Database), component 122 computes the mean, min, max, and SD for the cores and memory of the collected data in predetermined timely intervals. For example, computing the mean, min, max, and SD for the cores and memory of the collected data weekly, monthly, and/or yearly basis. In various embodiments of the present invention, component 122 reviews the computed SD, mean, min, and max values. In various embodiments of the present invention, component 122 computes the data stored in the DWDB tables. In one particular embodiment, component 122 computes the data stored in the DWDB tables by grouping statistics of the gathered data by the customer name and the vertical industry, calculating minimum and maximum user count, CPU, and memory values for a 24 hour period where in the 24 hour period is the next 24 hours or the past 24 hours, and calculating the min, max, mean and standard deviation (SD) for user count, CPU and memory usage per day. In various embodiments of the present invention, component 122 predicts the peak and trough consumption values by computing weekly, monthly, and yearly min, max, and SD values per customer using the values of the calculated data above.

In step 212, component 122 determines if the SD is within a predetermined range to the mean. In various embodiments of the present invention, component 122 determines if the SD is within a predetermined range to the mean based on the review of the computed SD and mean in step 210. In the depicted embodiment if the SD is within a predetermined range to the mean (Yes step) then component 122 advances to step 216. However, in the depicted embodiment, if the SD is not within a predetermined range to the mean (No step) then component 122 advances to step 214. In various embodiments of the present invention, component 122 consolidates the weekly, the monthly and the yearly min, max, and SD values per customer in the DWDB tables for each of the one or more vertical industries, time zones, applications and OS, creating a reference architecture for each vertical industry and the architecture size.

In step 214, component 122 updates the analytical database. In various embodiments of the present invention, component 122 updates the analytical database with the calculated mean, min, and max. For example, storing 52 weeks of the min, max, mean and SD values for CPU, memory and user counts consolidated by the vertical industry and architecture size and moving the 52 weeks of stored values to an analytical database.

In step 216, component 122 updates the DWDB. In various embodiments of the present invention, component 122 updates the DWDB using the SD, min and max, wherein the value of the SD is used for the solution.

In step 218, component 122 determines if the SD should be used. In various embodiments of the present invention, component 122 determines, based on an artificial intelligence (AI) decision tree, if the SD should be used. In the depicted embodiment, if component 122 determines that the SD should be used (Yes step) then component 122 advances to step 222. However, in the depicted embodiment, if component 122 determines that the SD should not be used (No step) then component 122 advances to step 220.

In step 220, component 122 uses the calculated min and max. In various embodiments of the present invention, component 122 removes the SD from DWDB tables and/or proposed architecture and updates the analytical database using the calculated min and max.

In step 222, component 122 updates the analytical database. In various embodiments of the present invention, component 122 updates the analytical database using the SD. In various embodiments of the present invention, component 122 stores a predetermined amount of the min, max, mean and SD values for CPU, memory and user counts consolidated by the vertical industry and architecture size and move the stored values to an analytical database. For example, component 122 stores 52 weeks of the min, max, mean and SD values for CPU, memory and user counts consolidated by the vertical industry and architecture size and move the 52 weeks of stored values to an analytical database. In various embodiments of the present invention, component 122 optimizes, by the analytical database, the computer system architecture provided to each customer based on computed data of the DWDB for each customer's vertical industry and time zone using the min, max, mean and SD for CPU and memory values using an AI-based architecture sizing decision tree.

Figure 3:
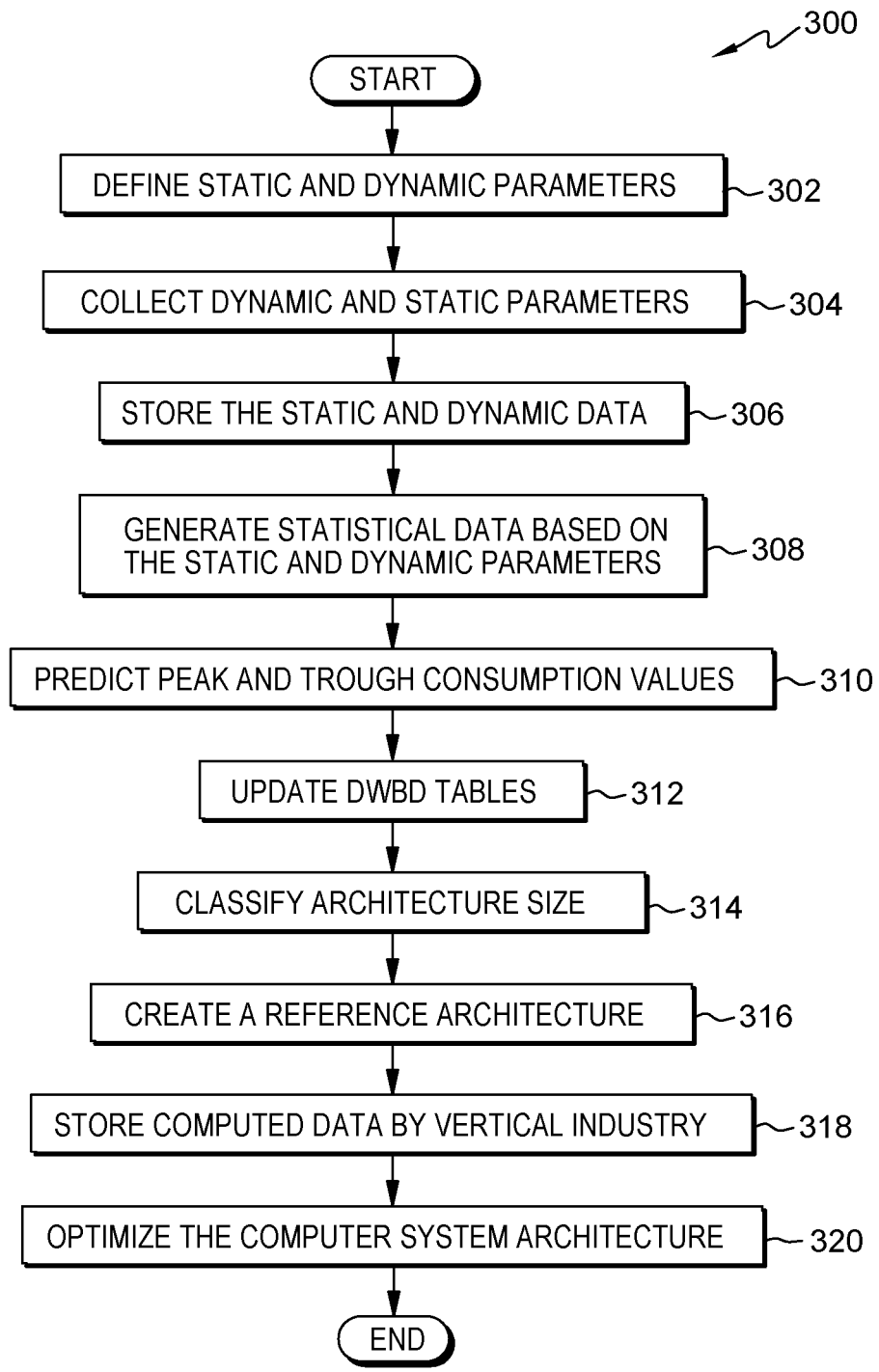
FIG. 3 illustrates operational steps of the architecture generation component, on a server computer within the distributed data processing environment of FIG. 1, for dynamically sizing computer system architecture requirements for bare-metal or virtual machines, in accordance with an embodiment of the present invention.

FIG. 3 illustrates operational steps of component 122, generally designated 300, in communication with computing device 110, within distributed data processing environment 100 of FIG. 1, for dynamically sizing computer system architecture requirements for bare-metal or virtual machines, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, component 122 defines static parameters and dynamic parameters. In various embodiments of the present invention, component 122 defines static parameters and dynamic parameters for each customer consuming resources of the computer system architecture, wherein static parameters include customer name, vertical industry, application name, operating system (OS), CPU and memory allocated, and dynamic parameters including user counts, CPU and memory utilization.

In step 304, component 122 collects dynamic and static data. In various embodiments of the present invention, component 122 periodically collects dynamic and static data based on the defined static and dynamic parameters, wherein the periodical collection of data is predetermined. For example, component 122 periodically collects for each customer, per node, the dynamic parameters at 1-minute intervals.

In step 306, component 122 stores the collected static and dynamic data. In various embodiments of the present invention, component 122 stores the collected static and dynamic data in DWDB tables.

In step 308, component 122 generates statistical data. In various embodiments of the present invention, component 122 generates statistical data based on the collected static and dynamic data by computing the static and dynamic data stored in the DWDB tables, wherein computing the stored data comprises: grouping statistics of the gathered data by the customer name and the vertical industry, calculating minimum and maximum user count, CPU, and memory values for 24 hours, and calculating min, max, mean and standard deviation (SD) for user count, CPU and memory usage per day.

In step 310, component 122 predicts peak and trough consumption values. In various embodiments of the present invention, component 122 predicts the peak and trough consumption values by computing weekly, monthly and yearly min, max, and SD values per customer using the values of the calculated data above.

In step 312, component 122 updates the DWBD tables. In various embodiments of the present invention, component 122 updates the DWDB using the SD, mean, min and max. In one particular embodiment, component 122 updates the DWDB tables based on the weekly, monthly and yearly min, max, mean and SD values per customer.

In step 314, component 122 classifies architecture size. In various embodiments of the present invention, component 122 classifies, based on mean user count for each of the customers, the architecture size associated with each of the customers.

In step 316, component 122 creates a reference architecture. In various embodiments of the present invention, component 122 creates a reference architecture for each vertical industry and the architecture size by consolidating the min, max, mean and SD values per customer in the DWDB tables for each of the one or more vertical industries, time zones, applications and OS. In one particular embodiment, component 122 creates a reference architecture for each vertical industry and the architecture size by consolidating the weekly, the monthly and the yearly min, max, and SD values per customer in the DWDB tables for each of the one or more vertical industries, time zones, applications and OS.

In step 318, component 122 stores the computer data by vertical industry. In various embodiments of the present invention, component 122 stores a predetermined amount of the min, max, mean and SD values for CPU, memory and user counts consolidated by the vertical industry and architecture size and move the stored values to an analytical database. For example, component 122 stores 52 weeks of the min, max, mean and SD values for CPU, memory and user counts consolidated by the vertical industry and architecture size and move the 52 weeks of stored values to an analytical database.

In step 320, component 122 optimizes the computer system architecture. In various embodiments of the present invention, component 122 optimizes, by the analytical database, the computer system architecture provided to each customer based on computed data of the DWDB for each customer's vertical industry and time zone using the min, max, mean and SD for CPU and memory values using an AI-based architecture sizing decision tree.

Figure 4:
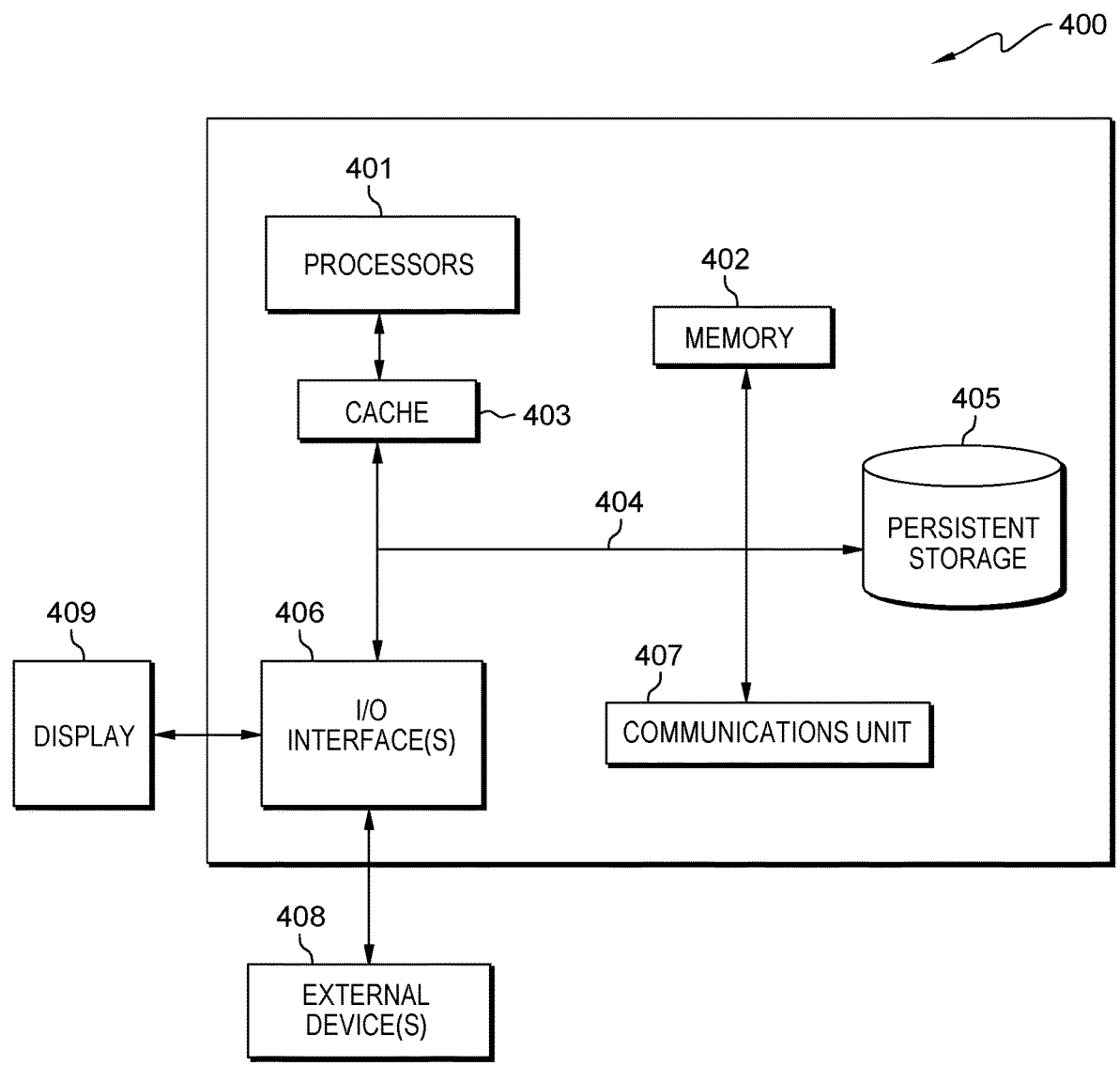
FIG. 4 depicts a block diagram of components of the server computer executing the authentication mechanism within the distributed data processing environment of FIG. 1, in accordance with an embodiment of the present invention.

FIG. 4 depicts a block diagram of components of server computer 120 within distributed data processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 depicts computer system 400, where server computing 120 represents an example of computer system 400 that includes component 122. The computer system includes processors 401, cache 403, memory 402, persistent storage 405, communications unit 407, input/output (I/O) interface (s) 406, display 409, external device(s) 408 and communications fabric 404. Communications fabric 404 provides communications between cache 403, memory 402, persistent storage 405, communications unit 407, and input/output (I/O) interface(s) 406. Communications fabric 404 may be implemented with any architecture designed for passing data and/or control information between processors (such as microprocessors, communications, and network processors, etc.), system memory, peripheral devices, and any other hardware components within a system. For example, communications fabric 404 may be implemented with one or more buses or a crossbar switch.

Memory 402 and persistent storage 405 are computer readable storage media. In this embodiment, memory 402 includes random access memory (RAM). In general, memory 402 may include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 enables for input and output of data with other devices that may be connected to each computer system. For example, I/O interface 406 may provide a connection to external devices 408 such as a keyboard, keypad, a touch screen, and/or some other suitable input device. External devices 408 may also include portable computer readable storage media such as, for example, thumb drives, portable optical or magnetic disks, and memory cards. Software and data used to practice embodiments of the present invention may be stored on such portable computer readable storage media and may be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for dynamically sizing computer system architecture requirements for virtual machines, the computer-implemented method comprising:
    defining static parameters and dynamic parameters for customer consuming resources of the computer system architecture;

storing data describing the static parameters and dynamic parameters in data warehouse database (DWDB) tables;

computing, using the data of the DWDB tables, wherein the computing comprises:
grouping one or more statistics of the stored data by customer name and one or more vertical industries;
calculating a minimum and a maximum for a user count and central processing unit (CPU) usage and memory usage values for a 24 hour period; and
calculating minimum, maximum, mean and standard deviation (SD) for the user count and the CPU and memory usage over the 24 hour period;

updating the DWDB tables based on the calculated minimum, maximum, and SD values per customer;

classifying, based on the mean user count per customer, an architecture size associated with each of the customers;

creating a reference architecture for each of the one or more vertical industries and the architecture size; and storing the computer data by the one or more vertical industries; and optimizing, by an analytical database, the computer system architecture provided to one or more customer based on the computing using the data of the DWDB tables for the one or more vertical industries and time zone of each respective customer using the minimum, the maximum, the mean and the SD for the CPU, and the memory values using an artificial intelligence-based architecture sizing decision tree.

2. The computer-implemented method of claim 1, wherein the static parameters include: customer name, the one or more vertical industries, application name, operating system (OS), CPU and memory allocated, and dynamic parameters including at least one user count, the CPU and memory utilization.

3. The computer-implemented method of claim 1, further comprising:
periodically gathering for one or more customers, per node, dynamic parameters at one-minute intervals.

4. The computer-implemented method of claim 1, further comprising:
predicting peak and trough consumption values by computing weekly, monthly and yearly minimum, maximum and SD values per customer using the calculated minimum, maximum, mean, and standard deviation for the user count and the central processing unit (CPU) and memory usage values.

5. The computer-implemented method of claim 1, wherein creating the reference architecture further comprises: consolidating a weekly, a monthly and a yearly minimum, maximum and SD value per customer in the DWDB tables for each of the one or more vertical industries, time zones, applications and operating system.

6. The computer-implemented method of claim 1, wherein the storing further comprises: storing 52 weeks of the minimum, minimum, mean and SD values for the CPU, memory and at least one user count consolidated by the one or more vertical industries and the architecture size and move the 52 weeks of stored values to the analytical database.

7. The computer-implemented method of claim 1, further comprising:
generating statistical data based on collected the static and dynamic parameters by computing the static and dynamic data stored in the DWDB tables, wherein computing the stored data comprises:
grouping statistics of the stored data by customer name and the one or more vertical industries;
calculating the minimum and maximum user count, CPU, and memory values for the 24 hour period; and
calculating the minimum, the minimum, the mean and the standard deviation (SD) for the user count, CPU, and memory usage per day.

8. A computer program product for dynamically sizing computer system architecture requirements for virtual machines, the computer program product comprising:
one or more computer readable storage media and program instructions stored on the one or more computer readable storage media, the stored program instructions comprising:
program instructions to define static parameters and dynamic parameters for customer consuming resources of the computer system architecture;
program instructions to store data describing the static parameters and dynamic parameters in data warehouse database (DWDB) tables;
program instructions to compute using the data of the DWDB tables, wherein the computing comprises:
program instructions to group one or more statistics of the stored data by customer name and one or more vertical industries;
program instructions to calculate a minimum and a maximum for a user count and central processing unit (CPU) usage and memory usage values for a 24 hour period; and
program instructions to calculate minimum, maximum, mean and standard deviation (SD) for the user count and the CPU and memory usage over the 24 hour period;
program instructions to update the DWDB tables based on the calculated minimum, maximum, and SD values per customer;
program instructions to classify, based on the mean user count per customer, an architecture size associated with each of the customers;
program instructions to create a reference architecture for each of the one or more vertical industries and the architecture size; and
program instructions to store the computer data by the one or more vertical industries; and
program instructions to optimize, by an analytical database, the computer system architecture provided to one or more customer based on the computing using the data of the DWDB tables for the one or more vertical industries and time zone of each respective customer using the minimum, the maximum, the mean and the SD for the CPU, and the memory values using an artificial intelligence-based architecture sizing decision tree.

9. The computer program product of 8, wherein the static parameters include: customer name, the one or more vertical industries, application name, operating system (OS), CPU and memory allocated, and dynamic parameters including at least one user count, the CPU and memory utilization.

10. The computer program product of 8, further comprising: program instructions to periodically gather for one or more customers, per node, dynamic parameters at one-minute intervals.

11. The computer program product of 8, further comprising: program instructions to predict peak and trough consumption values by computing weekly, monthly and yearly minimum, maximum and SD values per customer using the calculated minimum, maximum, mean, and standard deviation for the user count and the central processing unit (CPU) and memory usage values.

12. The computer program product of 8, wherein creating the reference architecture further comprises: program instructions to consolidating a weekly, a monthly and a yearly minimum, maximum and SD value per customer in the DWDB tables for each of the one or more vertical industries, time zones, applications and operating system.

13. The computer program product of 8, wherein the storing further comprises: program instructions to store 52 weeks of the minimum, minimum, mean and SD values for the CPU, memory and at least one user count consolidated by the one or more vertical industries and the architecture size and move the 52 weeks of stored values to the analytical database.

14. The computer program product of 8, further comprising:
  program instructions to generate statistical data based on collected the static and dynamic parameters by computing the static and dynamic data stored in the DWDB tables, wherein computing the stored data comprises:
  program instructions to group statistics of the stored data by customer name and the one or more vertical industries;
  program instructions to calculate the minimum and maximum user count, CPU, and memory values for the 24 hour period; and
  program instructions to calculate the minimum, the minimum, the mean and the standard deviation (SD) for the user count, CPU, and memory usage per day.

15. A computer system for dynamically sizing computer system architecture requirements for virtual machines, the computer system comprising:
  one or more computer processors;
  one or more computer readable storage devices;
  program instructions stored on the one or more computer readable storage devices for execution by at least one of the one or more computer processors, the stored program instructions comprising:
  program instructions to define static parameters and dynamic parameters for customer consuming resources of the computer system architecture;
  program instructions to store data describing the static parameters and dynamic parameters in data warehouse database (DWDB) tables;
  program instructions to compute using the data of the DWDB tables, wherein the computing comprises:
  program instructions to group one or more statistics of the stored data by customer name and the one or more vertical industries;
  program instructions to calculate a minimum and a maximum for a user count and central processing unit (CPU) usage and memory usage values for a 24 hour period; and
  program instructions to calculate minimum, maximum, mean and standard deviation (SD) for the user count and the CPU and memory usage over the 24 hour period;
  program instructions to update the DWDB tables based on the calculated minimum, maximum, and SD values per customer;
  program instructions to classify, based on the mean user count per customer, an architecture size associated with each of the customers;
  program instructions to create a reference architecture for each of the one or more vertical industries and the architecture size; and
  program instructions to store the computer data by the one or more vertical industries; and
  program instructions to optimize, by an analytical database, the computer system architecture provided to one or more customer based on the computing using the data of the DWDB tables for the one or more vertical industries and time zone of each respective customer using the minimum, the maximum, the mean and the SD for the CPU, and the memory values using an artificial intelligence-based architecture sizing decision tree.

16. The computer system of claim 15, wherein the static parameters include: customer name, the one or more vertical industries, application name, operating system (OS), CPU and memory allocated, and dynamic parameters including at least one user count, the CPU and memory utilization.

17. The computer system of claim 15, further comprising:
  program instructions to periodically gather for one or more customers, per node, dynamic parameters at one-minute intervals; and
  program instructions to predict peak and trough consumption values by computing weekly, monthly and yearly minimum, maximum and SD values per customer using the calculated minimum, maximum, mean, and standard deviation for the user count and the central processing unit (CPU) and memory usage values.

18. The computer system of claim 15, wherein creating the reference architecture further comprises: program instructions to consolidating a weekly, a monthly and a yearly minimum, maximum and SD value per customer in the DWDB tables for each of the one or more vertical industries, time zones, applications and operating system.

19. The computer system of claim 15, wherein the storing further comprises: program instructions to store 52 weeks of the minimum, minimum, mean and SD values for the CPU, memory and at least one user count consolidated by the one or more vertical industries and the architecture size and move the 52 weeks of stored values to the analytical database.

20. The computer system of claim 15, further comprising:
  program instructions to generate statistical data based on collected the static and dynamic parameters by computing the static and dynamic data stored in the DWDB tables, wherein computing the stored data comprises:
  program instructions to group statistics of the stored data by customer name and the one or more vertical industries;
  program instructions to calculate the minimum and maximum user count, CPU, and memory values for the 24 hour period; and
  program instructions to calculate the minimum, the minimum, the mean and the standard deviation (SD) for the user count, CPU, and memory usage per day.

\* \* \* \* \*